(12) United States Patent
Berruet et al.

(10) Patent No.: US 9,551,408 B2
(45) Date of Patent: Jan. 24, 2017

(54) MECHANICAL SYSTEM, INJECTION PUMP AND VALVE ACTUATOR COMPRISING SUCH A MECHANICAL SYSTEM AND MANUFACTURING METHOD

(71) Applicants: Nicolas Berruet, Artannes sur Indre (FR); Charles Chambonneau, Joué lès Tours (FR); Benoît Hauvespre, Saint Etienne de Chigny (FR); Samuel Viault, Saint-Antoine-du-Rocher (FR)

(72) Inventors: Nicolas Berruet, Artannes sur Indre (FR); Charles Chambonneau, Joué lès Tours (FR); Benoît Hauvespre, Saint Etienne de Chigny (FR); Samuel Viault, Saint-Antoine-du-Rocher (FR)

(73) Assignee: AKTIEBOLAGET SKF, Gothenburg (SE)

( * ) Notice: Subject to any disclaimer, the term of this patent is extended or adjusted under 35 U.S.C. 154(b) by 124 days.

(21) Appl. No.: 14/499,989

(22) Filed: Sep. 29, 2014

(65) Prior Publication Data
US 2015/0090209 A1  Apr. 2, 2015

(30) Foreign Application Priority Data

Sep. 27, 2013  (EP) .................................... 13186511

(51) Int. Cl.
| | |
|---|---|
| *F01L 1/14* | (2006.01) |
| *F16H 53/06* | (2006.01) |
| *F04B 1/04* | (2006.01) |
| *F02M 37/06* | (2006.01) |
| *F01L 1/04* | (2006.01) |
| *F02M 59/10* | (2006.01) |

(52) U.S. Cl.
CPC ............. *F16H 53/06* (2013.01); *F01L 1/04* (2013.01); *F01L 1/14* (2013.01); *F01L 1/143* (2013.01); *F02M 37/06* (2013.01); *F02M 59/102* (2013.01); *F04B 1/0439* (2013.01); *F01L 2105/00* (2013.01); *F01L 2107/00* (2013.01); *Y10T 29/49295* (2015.01); *Y10T 29/49826* (2015.01); *Y10T 74/2107* (2015.01)

(58) Field of Classification Search
CPC ......... F16H 53/06; F01L 2107/00; F01L 1/16; F01L 1/143; F01L 1/14
USPC ................................. 123/90.48, 90.49, 90.5
See application file for complete search history.

(56) References Cited

U.S. PATENT DOCUMENTS

| | | | |
|---|---|---|---|
| 5,415,533 A | | 5/1995 | Egger et al. |
| 8,863,615 B2 * | | 10/2014 | Yabuuchi ................ F01L 1/143 74/569 |
| 2008/0190237 A1 * | | 8/2008 | Radinger ................ F01L 1/143 74/569 |

(Continued)

FOREIGN PATENT DOCUMENTS

EP  2607636 A1  6/2013

*Primary Examiner* — Jorge Leon, Jr.
(74) *Attorney, Agent, or Firm* — Bryan Peckjian; SKF USA Inc. Patent Dept.

(57) ABSTRACT

A mechanical system comprising: a tappet, including a body; an insert mounted in the body; a pin extending along a first axis; and a roller element movable in rotation relative to the pin around the first axis. The insert supports the pin, while the body supports the insert, along at least one first direction parallel to a second axis which is perpendicular to the first axis. The mechanical system can be integrated into an injection pump and/or a valve actuator.

18 Claims, 6 Drawing Sheets

(56) References Cited

U.S. PATENT DOCUMENTS

2011/0158835 A1* 6/2011 Yabuuchi ............... F01L 1/143
                                                    417/471

* cited by examiner

MECHANICAL SYSTEM, INJECTION PUMP AND VALVE ACTUATOR COMPRISING SUCH A MECHANICAL SYSTEM AND MANUFACTURING METHOD

CROSS REFERENCE TO RELATED APPLICATION

This is a National Stage application claiming the benefit of European Union Patent Application Number 13186511.5 filed on 27 Sep. 2013 (27.09.2013), which is incorporated herein by reference in its entirety.

TECHNICAL FIELD OF THE INVENTION

The invention concerns a mechanical system. The invention also concerns an injection pump and a valve actuator for a motor vehicle, by example for a gasoline engine car, each comprising such a mechanical system. The invention also concerns a method for manufacturing such a mechanical system.

BACKGROUND OF THE INVENTION

Classically, a cam follower belonging to an injection pump comprises a tappet, a roller and a pin. The roller and the pin are centered on a transverse axis, while the tappet extends along a longitudinal axis. The pin is fixed to the tappet, while the roller is movable in rotation relative to the pin around its axis. When the cam follower is in service, the roller collaborates with a cam synchronized with the internal combustion engine camshaft. The rotation of the camshaft leads to a periodic displacement of a piston of the pump that rests against the tappet, to allow fuel to be delivered. The tappet is movable back and forth along the longitudinal axis.

It is known to provide the cam follower with an insert as a stroke-transmission part mounted in the tappet.

US-A-2008 190 237 describes various embodiments of a cam follower comprising such an insert. In all embodiments, the body of the tappet supports at least partially the pin. Thus, a load transmitted from the roller to the pin along the longitudinal axis is at least partially received by the body. In certain embodiments, the body includes local projections for supporting the insert. Either a ring is interposed between the insert and the projections, or the insert includes recesses receiving the projections.

SUMMARY OF THE INVENTION

The aim of the invention is to provide an improved mechanical system, such as a cam follower.

To this end, the invention concerns a mechanical system, comprising: a tappet including a body, an insert mounted in the body, a pin extending along a first axis, and a roller element movable in rotation relative to the pin around the first axis.

According to the invention, the insert supports the pin, while the body supports the insert, along at least one first direction parallel to a second axis which is perpendicular to the first axis.

Thanks to the invention, design of the mechanical system and its assembly are simplified. The tappet body supports the insert but does not directly support the pin along the longitudinal axis. Advantageously, the insert can rest directly against protrusions formed in the body without interposition of a ring between them and without specific recesses formed in the insert.

According to further aspects of the invention which are advantageous but not compulsory, such a mechanical system may incorporate one or several of the following features:

The body includes at least one local deformation adapted to prevent the insert from moving along the first direction when the mechanical system is in service.

The body includes at least one local deformation adapted to prevent the insert from moving along a second direction opposed to the first direction along the second axis when the mechanical system is in service.

The insert comprises two support portions and the pin comprises two opposite ends, each supported by one of the two support portions of the insert along at least the first direction.

The body has a cylindrical shape centered on the second axis, the tappet being preferably devoid of any through hole extending between an outer surface and an inner surface of the body The mechanical system comprises two ribs resting on either side of the ends of the pin for axial retention of the pin along the first axis.

The insert is clamped inside the body, preferably force-fitted inside the body.

The insert is mounted with a play inside the body, then fixed to the body, by example by crimping, welding or soldering.

The body is made of synthetic material, for example of polyamide or polyether-ether-ketone, or made of metal, for example of steel.

The mechanical system comprises at least one antirotation device integrally formed with the body or with the insert.

The mechanical system comprises a bearing interposed between the pin and the roller element.

The mechanical system constitutes a cam follower, the tappet is movable along the second axis and the roller element is adapted to roll on an outer surface of a cam.

The invention also concerns an injection pump for a motor vehicle, equipped with a mechanical system as mentioned here-above.

The invention also concerns a valve actuator for a motor vehicle, equipped with a mechanical system as mentioned here-above.

The invention also concerns a method for manufacturing a mechanical system as mentioned here-above, wherein the pin is positioned in the insert while the insert is positioned in the body. Preferably, the body includes at least one local deformation adapted to prevent the insert from moving along the first direction when the mechanical system is in service. The insert can be clamped inside the body, preferably force-fitted inside the body. Alternatively, the insert can be crimped to the body.

BRIEF DESCRIPTION OF THE DRAWINGS

The invention will now be explained in correspondence with the annexed figures, as an illustrative example, without restricting the object of the invention. In the annexed figures.

DETAILED DESCRIPTION OF SOME EMBODIMENTS

The mechanical system 1 represented on FIGS. 1 to 7 is of the cam follower type, adapted to equip an injection pump for a motor vehicle, preferably for a gasoline engine car, not shown.

The system 1 comprises a tappet 10, an insert 20, a pin 30, a roller 40 and a bearing 50. Pin 30, roller 40 and bearing 50 are centered on a transverse axis X1, while tappet 10 is centered on a longitudinal axis Y1. Axis X1 and Y1 are perpendicular. In the preferred embodiment of FIGS. 1 to 7, the bearing 50 consists of needles 52. Alternatively, it may consist of cylindrical rollers or a sliding bushing.

Tappet 10 comprises a cylindrical tappet body 11 centered on axis Y1 and extending between an upper edge 12 and a lower edge 13. A first direction D1 is defined along axis Y1 toward lower edge 13, while a second direction D2 opposed to D1 is defined along axis Y1 toward upper edge 12. Body 11 has a cylindrical outer surface 14 and a cylindrical inner surface 15 delimiting a cavity 16 inside tappet 10. This cavity 16 is adapted to receive a plunger or push rod, not shown, following tappet 10 along axis Y1. This cavity 16 is also adapted to receive insert 20. Advantageously, tappet 10 is devoid of any through hole extending between outer surface 14 and inner surface 15 of body 11.

Tappet 10 is movable back and forth along axis Y1, alternatively in direction D1 or D2, with surface 14 sliding in a non-represented bore belonging to the injection pump or motor. Tappet 10 allows roller 40 to move along direction D2 up to contact with the non-represented cam. Tappet 10 can be made of synthetic material, by example polyamide 6,6 (PA) or polyether-ether-ketone (PEEK), or made of metal, by example steel. Material of the tappet 10 is chosen resistant to oil flow and its additives, and temperature variations.

Insert 20 comprises a central core 21 and four lateral tab 22, 23, 25 and 26 extending from central portion 21 opposite axis Y1, then partly along a direction parallel to axis Y1. Each tab 22, 23, 25 and 26 comprises a curved portion, respectively 221, 231, 251 and 261, extending from core 21 opposite axis Y1 then curved from radial direction to upper direction; and an axial portion, respectively 222, 232, 252 and 262, extending along a direction parallel to axis Y1. Portions 222 and 223 are curved around axis Y1 and adapted to rest against bore 15 of tappet 10. Portion 252 is a lateral flange comprising a curved upper surface 253, two plane lower surfaces 254 and a cylindrical bore 258. Portion 262 is a lateral flange comprising a curved upper surface 263, two plane lower surfaces 264 and a cylindrical bore 268. Bores 258 and 268 are preferably machined.

Insert 20 forms a support element for pin 30, roller 40 and bearing 50. Specifically, bores 258 and 268 of insert 20 are adapted to receive pin 30, on which roller 40 and bearing 50 are mounted. When insert 20 is fixed to tappet 10, the two lateral flanges 252 and 262 extend parallel to axis Y1 in a bifurcated manner, on both side of axis Y1, with surfaces 254 and 264 resting against edge 12. The flanges 252 and 262 delimit between them an intermediate gap 27. Both bores 258 and 268 extend through flanges 252 and 262 along same axis X1 and have the same diameter. Bores 258 and 268 form support portions adapted to receive ends 35 and 36 of pin 30. In other words, each end 35 and 36 is supported by one of the two bores 258 and 268. Thus, pin 30 is supported by the insert 20, particularly along directions D1 and D2 parallel to axis Y1.

Besides, insert 20 comprises an antirotation device 24 integrally formed thereto. Device 24 is a pin protruding from tab 23 along a direction parallel to an axis Z1 perpendicular to axes X1 and Y1. Pin 24 has a curved portion 241 and a radial portion 242. Portion 241 extends from tab 23 along axis Y1 then is curved opposite axis Y1 along axis Z1. Portion 242 extends along axis Z1, opposite axis Y1. Portion 242 comprises two lateral faces 243 and upper and lower faces 244. When system 1 is operated, pin 24 and more precisely faces 243 cooperates with a non-represented guiding groove, formed in the bore surrounding the tappet. Thus, pin 24 prevents tappet 10 from rotating in this bore around axis Y1. Depending on configuration of the injection pump, lower and upper faces 244 of pin 24 may form end stops adapted to abut against extremities of the guiding groove or of another part.

Insert 20 is preferably made of metal, by example steel such as XC75. Material of insert 20 is chosen resistant to oil flow, temperature variations and mechanical strains. Insert 20 is preferably formed by stamping. In other words, elements 21 to 26 are delimited in a plane metal sheet, and then formed by stamping. Holes 28 are delimited between portions 221, 231, 251 and 261, in order to save material and avoid cracks when insert 20 is deformed by stamping. Insert 20 is clamped inside body 11, preferably force-fitted. Alternatively, insert 20 is mounted inside body 11 with a play radially to axis Y1, and then fixed to body 11, for instance by crimping, welding or soldering.

Body 11 comprises local deformations 90 and 100 for fixing insert 20 to tappet 10. Deformations 100 are made after deformations 90. On the example of FIGS. 1 to 7, body 11 includes four deformations 90 regularly distributed around axis Y1 and five deformations 100 distributed on edge 12. Deformations 90 may be made by punching outer surface 14 of body 11, thus including a recess 91 formed on outer surface 14 and a protrusion 92 formed on inner surface 15 toward axis Y1. Portions 221 and 231 of insert 20 come in bearing contact with protrusions 92 inside cavity 16, thus preventing insert 20 to move inside cavity 16 along direction D1, as shown on FIG. 3. In other words, body 11 supports insert 20 along direction D1. Due to the specific dimensions of insert 20, portions 251 and 261 are not in bearing contact with protrusions 92 inside cavity 16, as shown on FIG. 4. Alternatively, body 11 may comprise only two deformations 90, with protrusions 92 in contact with portions 221 and 231 of insert 60. Deformations 90 can be made before or after mounting insert 20 inside body 11. Deformations 100 are made by punching material of edge 12 against insert 20 along direction D1, thus preventing insert 20 to move along direction D2 and outside cavity 16 at edge 12. Thanks to deformations 90 and 100, insert 20 is crimped to body 11.

Pin 30 comprises a cylindrical surface 32 extending between two pin ends 35 and 36. In practice, pin ends 35 and 36 are adapted to be caulked, respectively in bores 258 and 268. Pin 30 is made of metal, such as steel or bronze. If made of steel, pin 30 is preferably subjected to heat treatment before the caulking step. More precisely, pin ends 35 and 36 may be subjected to an induction hardening step just before the caulking step.

Roller 40 has an outer cylindrical surface 41 and an inner cylindrical bore 42 centered on axis X1. Surface 41 is intended to bear against an outer surface of a non-represented cam, synchronized with the internal combustion engine camshaft. Surface 41 is preferably subjected to heat treatment to increase its resistance to load and/or wear.

Needle bearing 50 comprises a series of needles 52 extending parallel to axis X1 and distributed regularly around axis X1. Needles 52 are interposed between surface 32 of pin 30 and surface 42 of roller 40.

During the assembly of system 1, roller 40 and rolling bearing 50 are positioned before pin 30 in the intermediate gap 27 between the two flanges 252 and 262. Then pin 30 is inserted inside bores 258 and 268 of insert 20 and inside rolling bearing 50. Finally pin ends 35 and 36 are caulked by press-fit in bores 258 and 268. At this stage, roller 40 is movable in rotation relative to pin 30 around axis X1. Pin axis, roller axis and rolling bearing axis merge with axis X1. Roller 40 is then adapted to roll, more precisely its surface 41 can roll, on an outer surface of the non-represented cam.

In practice, the load applied on surface 41 of roller 40 is transmitted to rolling bearing 50, then to pin 30, then to insert 20, then to tappet 10 and to the non-represented plunger or push rod located inside cavity 16 of tappet 10. Core 21 of insert 20 rests in contact against this plunger or push rod. Thanks to the invention, most of the load applied on roller 40 along direction D1 is received by insert 20 instead of tappet 10, then is transmitted to the plunger or push rod. Tappet 10 slides back and forth but bears few mechanical strains along axis Y1.

According to the invention, insert 20 has three different functions. Insert 20 forms a support element for pin 30. Insert 20 comprises an antirotation device 24 integrally formed thereto. Insert 20 is in resting contact with the plunger or push rod located inside cavity 16 for load transmission along direction D1.

Others embodiments of the invention are represented on FIGS. 8 to 13. Only the differences with respect to the first embodiment are described hereafter.

Figure 1:
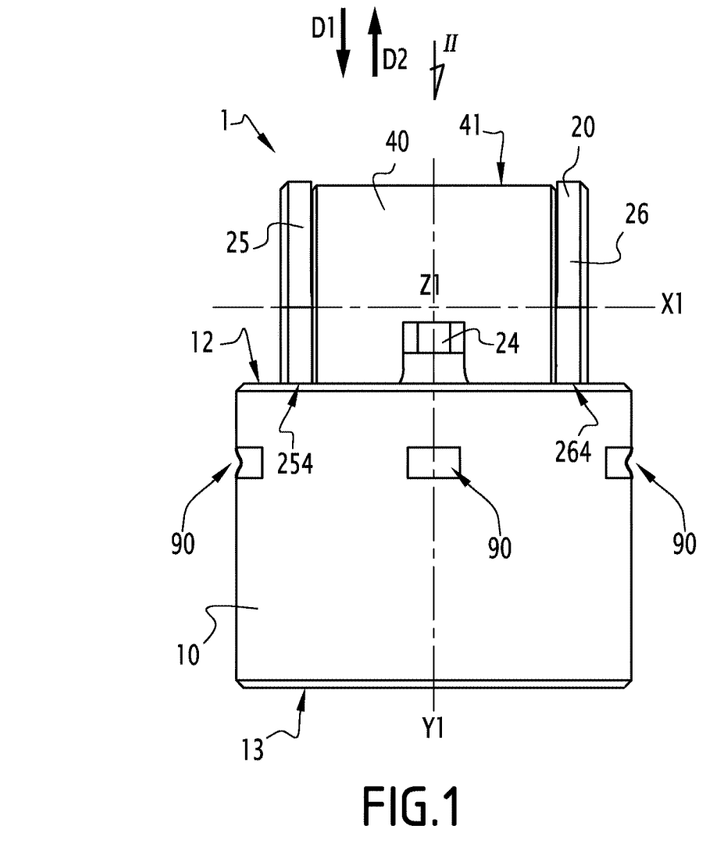
FIG. 1 is a side view of a mechanical system according to the invention, of the cam follower type, comprising a tappet, an insert and a roller.
Figure 2:
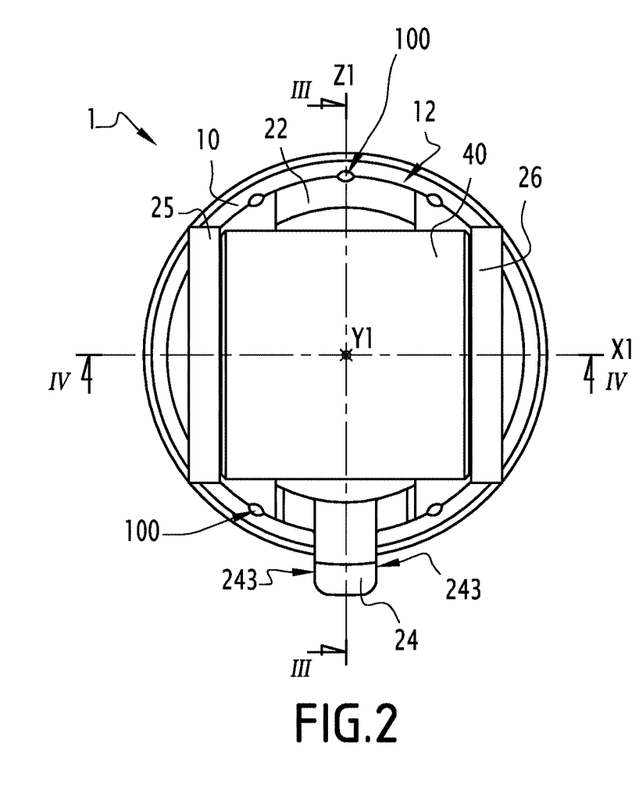
FIG. 2 is a top view, along arrow II of FIG. 1.
Figure 3:
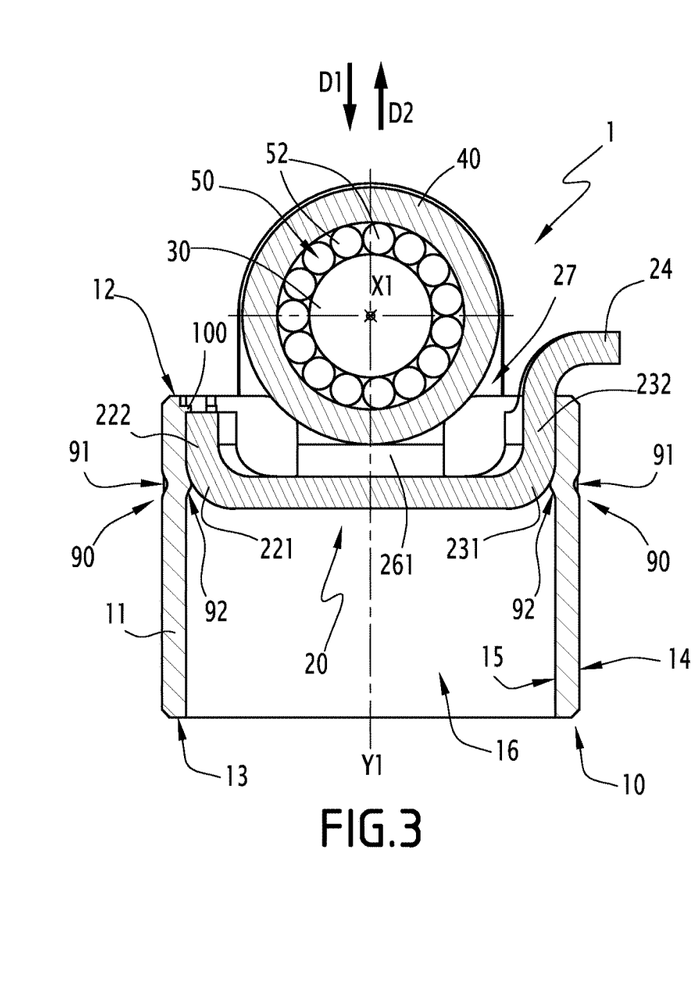
FIGS. 3 and 4 are a sectional views, respectively along line III-III and along line IV-IV of FIG. 2, showing a pin and a bearing supporting the roller.
Figure 4:
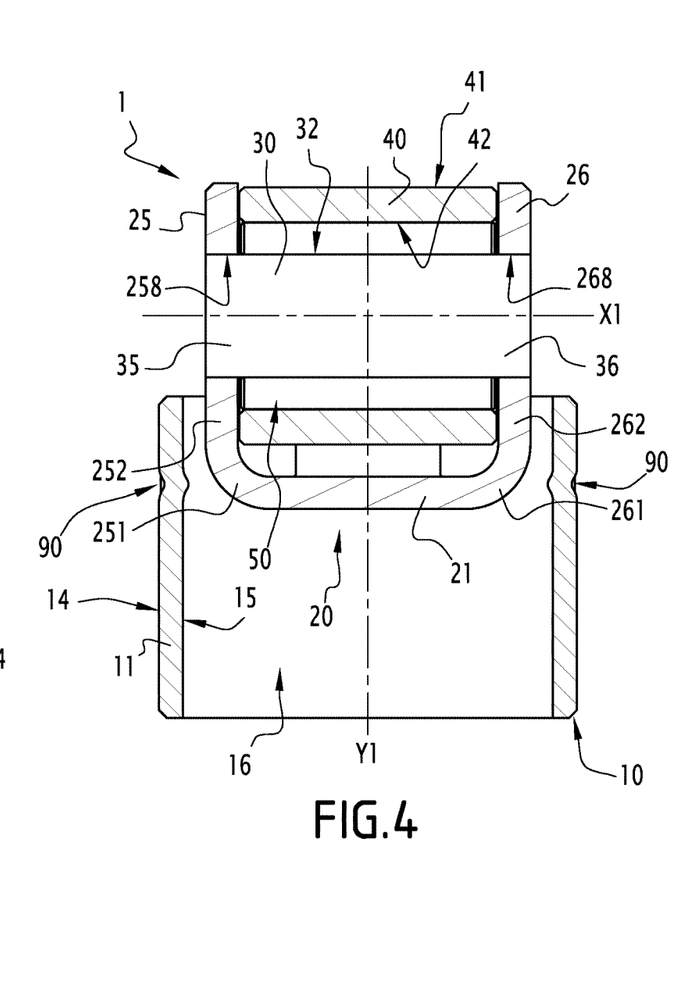
Figure 5:
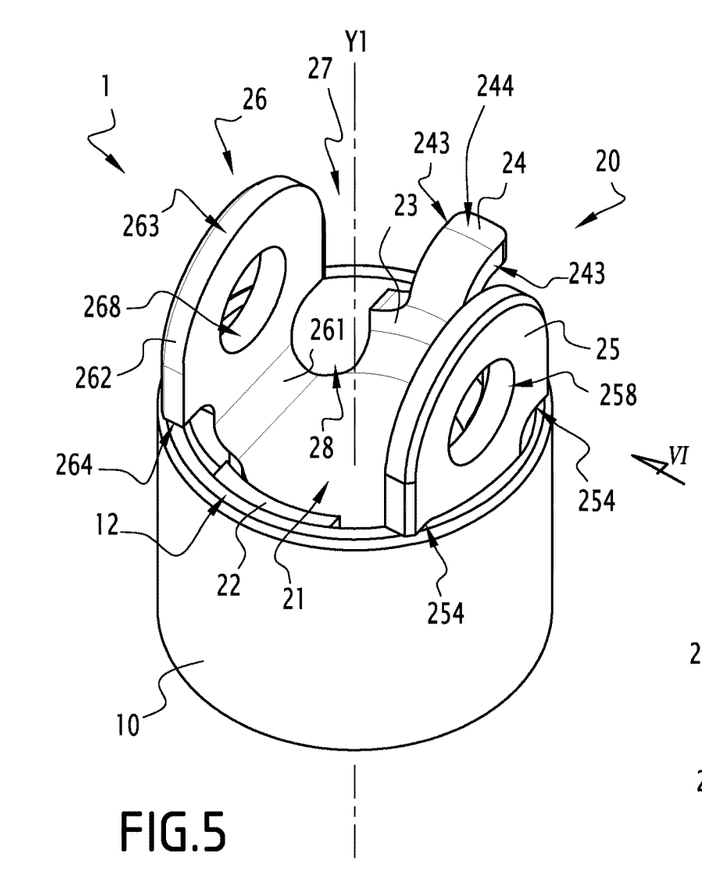
FIG. 5 is a perspective view showing the tappet and the insert belonging to the mechanical system of FIGS. 1 to 4, without the pin, the bearing and the roller.
Figure 6:
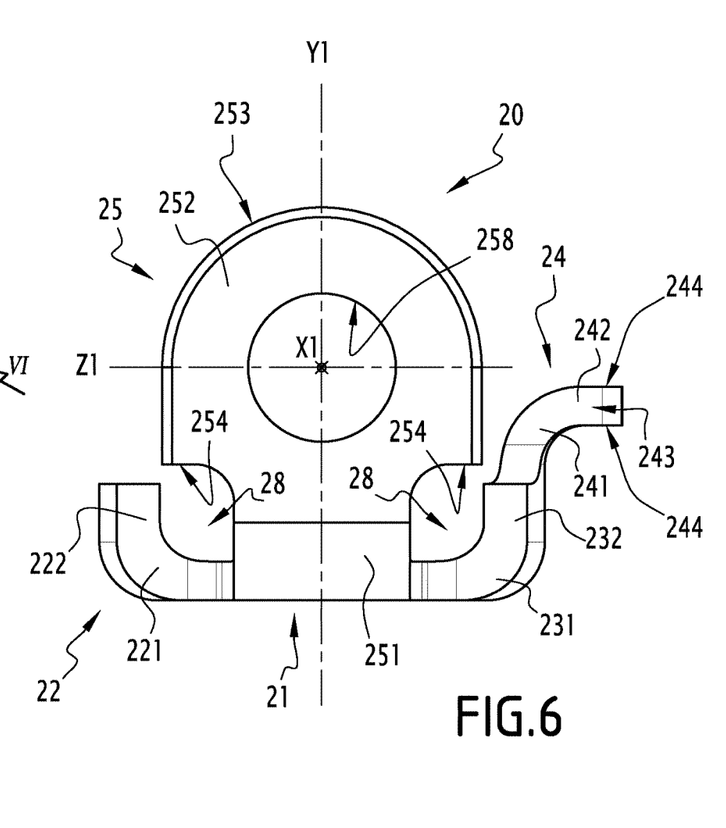
FIG. 6 is a side view of the insert, along arrow VI of FIG. 5.
Figure 7:
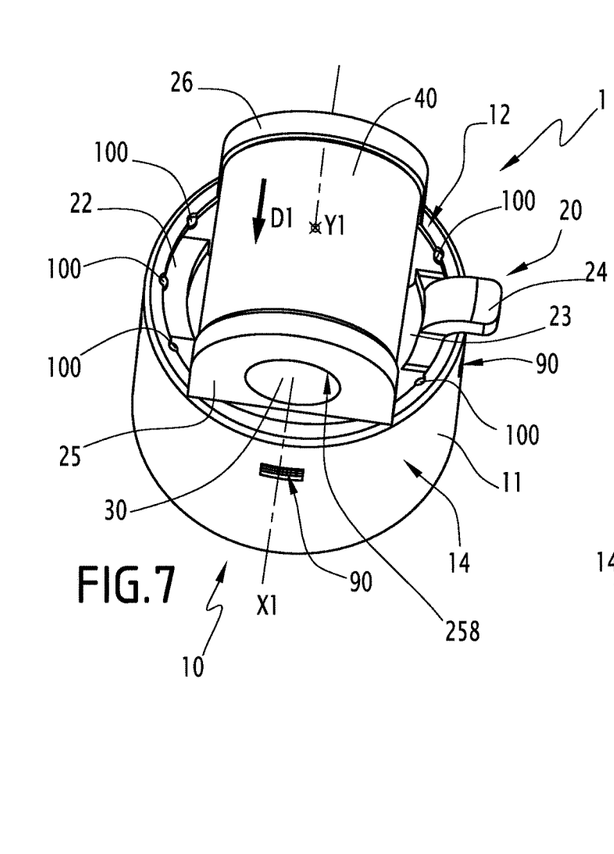
FIG. 7 is a another perspective view, showing the mechanical system of FIGS. 1 to 4.
Figure 8:
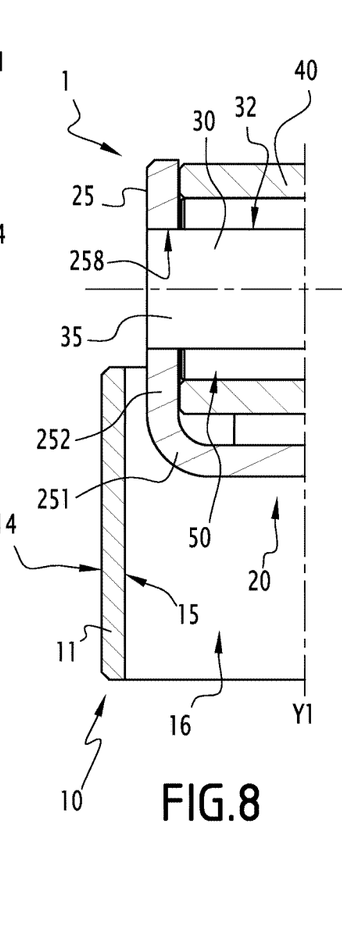
FIG. 8 is a partial sectional view similar to the left half of FIG. 4, showing a mechanical system according to a second embodiment of the invention.

A second embodiment of the invention is represented on FIG. 8. No local deformations 90 are made near portions 251 and 261 of insert 20, while portions 221 and 231 of insert 20 come in bearing contact with protrusions 92 inside cavity 16, thus preventing insert 20 to move inside cavity 16 along direction D1.

Figure 9:
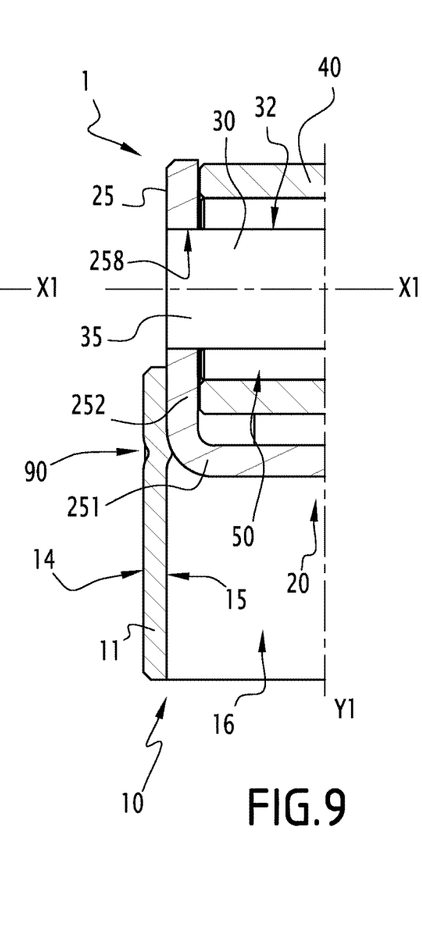
FIG. 9 is a partial sectional view similar to FIG. 8, showing a mechanical system according to a third embodiment of the invention.
Figure 10:
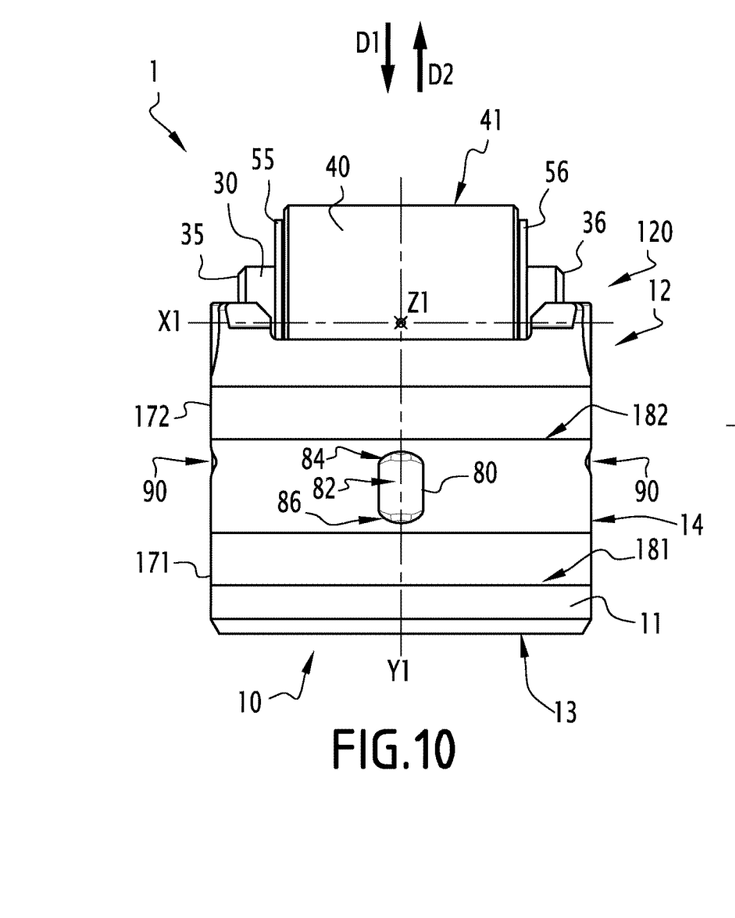
FIGS. 10 to 13 are views similar respectively to FIGS. 1 to 4, showing a mechanical system according to a fourth embodiment of the invention.
Figure 11:
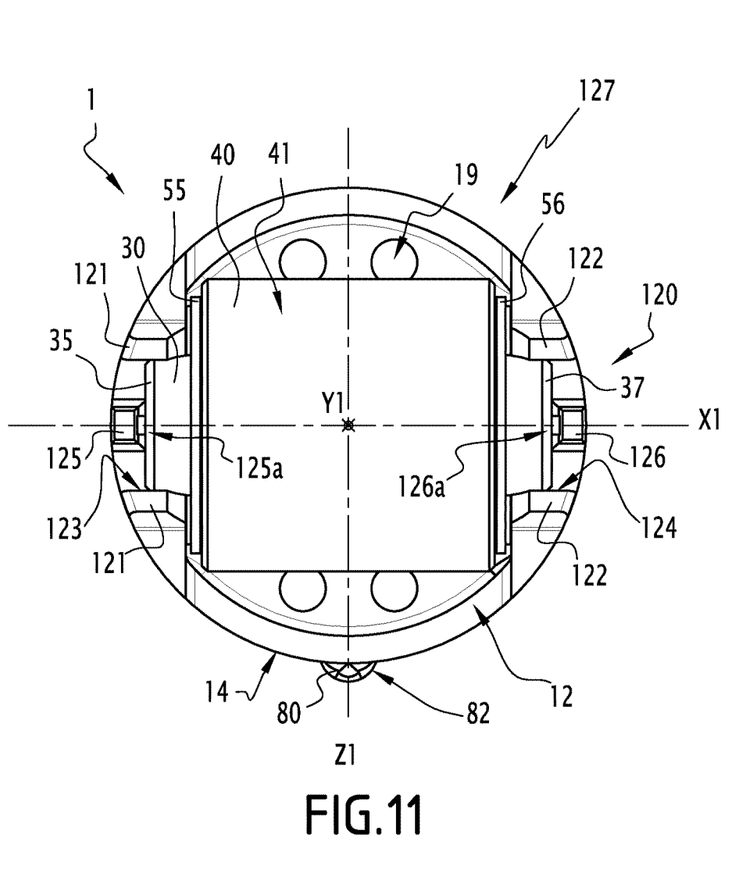

A third embodiment of the invention is represented on FIG. 9. Portions 221, 231, 251 and 261 of insert 20 come in bearing contact with protrusions 92 inside cavity 16, thus preventing insert 20 to move inside cavity 16 along direction D1.

A fourth embodiment of the invention is represented on FIGS. 10 to 13. System 1 comprises an insert 320, with constitutive portions having references increased by 300 in comparison with the first embodiment.

Tappet 10 comprises a central radial portion 17 extending from body 11 toward axis Y1, between edges 12 and 13. Tappet 10 includes a lower cavity 16 and an upper cavity 18 delimited either side of portion 17. Cavity 16 is adapted to receive a shaft, not shown, for moving tappet 10 along axis Y1. Cavity 18 is adapted to partly receive pin 30, roller 40 and bearing 50. Portion 17 comprises plane surfaces 17*a* for receiving planes surfaces 321*a* of insert 320 in bearing contact along directions parallel to axis Z1. Four holes 19 extend through portion 17 parallel to axis Y1, connecting cavities 16 and 18, to allow a flow of lubricant therebetween.

Tappet 10 also comprises an antirotation device 80 integrally formed thereto, on its outer surface 14. Device 80 is a pin protruding from surface 14 along a direction parallel to an axis Z1 perpendicular to axes X1 and Y1. Pin 80 has an outer surface 82 having a rounded shape in a sectional plane perpendicular to axis Y1, as shown on FIG. 11. Surface 82 cooperates with a non-represented guiding groove, formed in the bore surrounding the tappet. Thus, pin 80 prevents tappet 10 from rotating in this bore around axis Y1. Pin 80 extends along axis Y1 between two extremities 84 and 86, each having a rounded shape in a sectional plane comprising axis Y1 and Z1. Depending on configuration of the injection pump, extremities 84 and 86 may form end stops adapted to abut against extremities of the guiding groove or of another part. On the example of FIGS. 10 to 13, pin 80 is located substantially at half length of surface 14 along axis Y1, between edges 12 and 13. Preferably, pin 80 is moulded as one single part together with tappet 10. As an alternative, pin 80 may be formed by plastic deformation of tappet 10, for example by punching from inside cavity 16 of tappet 10, with a punch applied to bore 15 and deforming body 11. As another alternative, pin 80 may be machined in the mass of tappet 10.

Tappet 10 also includes two annular grooves 171 and 172 centered on axis Y1. Grooves 171 and 172 are open at surface 14. Groove 171 is closer to edge 13, while groove 172 is closer to edge 12. Tappet 10 also includes two annular inserts 181 and 182, preferably made of metal. Insert 181 is fitted inside groove 171, while insert 182 is fitted inside groove 172. Inserts 181 and 182 allows reducing wear of tappet 10 sliding in the non-represented bore.

Tappet 10 also comprises a bearing portion 120 located at its upper edge 12, extending from upper edge 12 of body 11 opposite lower edge 13. Bearing portion 120 is adapted to receive pin 30, on which roller 40 and bearing 50 are mounted. To this end, bearing portion 120 comprises two pairs of stops or tabs 121 and 122 extending from portion 120 in a bifurcated manner, on both side of axis Y1. Each of the tabs 121 and 122 is elastically deformable. Pair of tabs 121 is projected substantially in a first plane parallel to axis Y1, while pair of tabs 122 is projected substantially in a second plane parallel to axis Y1. The pairs of tabs 121 and 122 delimit between them an intermediate gap 127 joining cavity 18. The pairs of tabs 121 and 122 are adapted to receive pin 30 clipped into them. On the bearing portion 120, each pair of tabs 121 and 122 delimits a partial cylindrical bore, respectively 123 and 124. Partial bores 123 and 124 are centered on axis X1 and have the same diameter. The pairs of tabs 121 and 122 provide radial retention of pin 30 radially to axis X1, particularly along a direction parallel to axis Z1.

According to the invention, bearing portion 120 of tappet 10 is also provided with two opposed ribs 125 and 126 for axial retention of pin 30 along axis X1. Ribs 125 and 126 extend from edge 12 parallel to axis Y1 and perpendicular to axis X1. Rib 125 is located between tabs 121, while rib 126 is located between tabs 122, on respective side of axis Y1. Each of the ribs 125 and 126 is elastically deformable. Together with the pairs of tabs 121 and 122, the ribs 125 and 126 delimit the intermediate gap 127 receiving pin 30. The ribs 125 and 126 have inner faces, respectively 125*a* and 126*a*, resting on either side of the pin 30 along the first axis X1. The ribs 125 and 126 provide axial retention of pin 30 relative to axis X1.

In practice, bearing portion 120 may have different configurations without leaving the scope of the invention. Tabs 121 and 122 and ribs 125 and 126 are designed with a mechanical resistance sufficient when system 1 is in service. Preferably, tabs 121 and 122 and ribs 125 and 126 are integrally formed with tappet 10.

Figure 12:
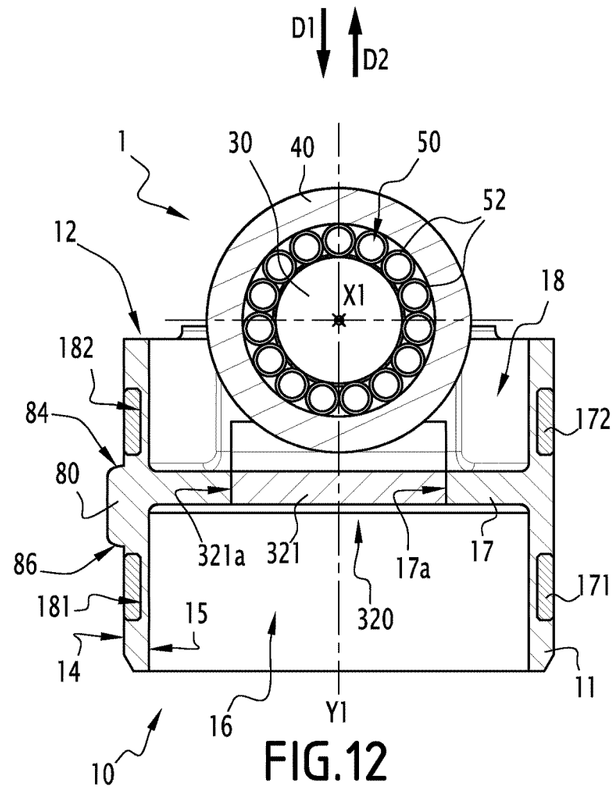
Figure 13:
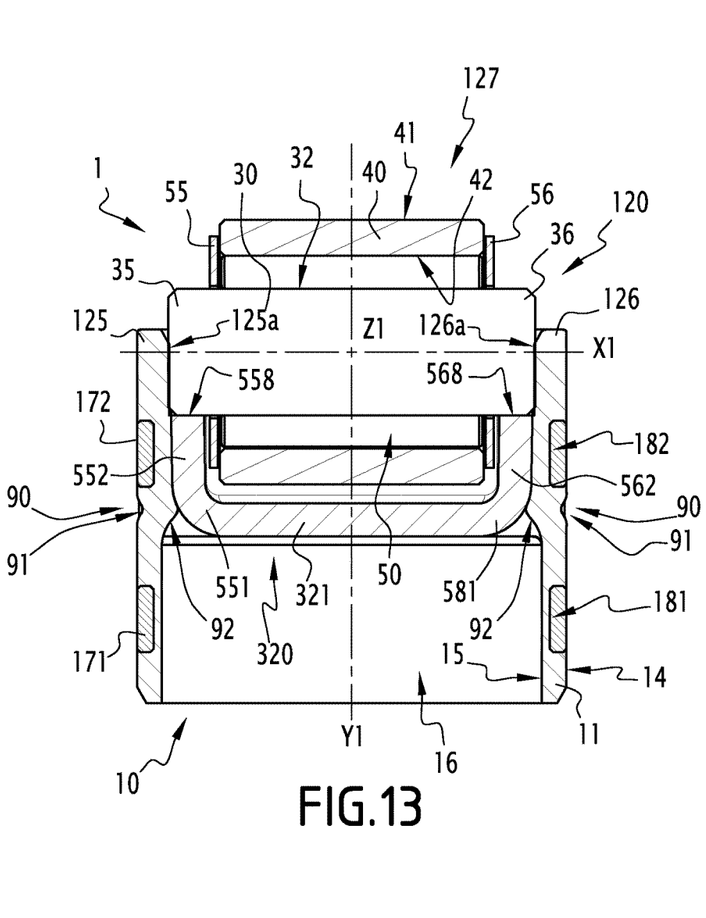

As shown on FIGS. 12 and 13, insert 320 has a U-shape in a plane including axes X1 and Y1. Insert 320 comprises a plane central portion or core 321 and two plane lateral portions 552 and 562. Insert 60 comprises a curved portion 551 connecting portions 321 and 552 and a curved portion 561 connecting portions 321 and 562. Central portion 321 comprises lateral plane surfaces 321a in contact with plane surfaces 17a of central portion 17. Curved portions 551 and 561 are in contact with protrusions 92 formed on body 11. Thus, body 11 supports insert 320 along direction D1. Portion 552 comprises a half-cylindrical section 558 supporting end 35 of pin 30 together with bore 123. Portion 562 comprises a half-cylindrical section 568 supporting end 36 of pin 30 together with bore 124. Sections 558 and 568 are preferably machined.

When mechanical system 1 is mounted, pin 30, roller 40 and rolling bearing 50 are inserted in the intermediate gap 127. Pin ends 35 and 36 are clipped into the pairs of tabs 121 and 122, in contact with bores 123 and 124, ribs 125 and 126 and support sections 558 and 568. At this stage, roller 40 is movable in rotation relative to pin 30 around axis X1. Pin axis, roller axis and rolling bearing axis merge with axis X1. Roller 40 is then adapted to roll, more precisely its surface 41 can roll, on an outer surface of the non-represented cam.

In practice, the load applied on surface 41 of roller 40 is transmitted to rolling bearing 50, then to pin 30, then to insert 320 and to bearing portion 120 of tappet 10, then to the non-represented plunger or push rod located inside cavity 16 of tappet 10. Core 321 of insert 320 rests in contact against this plunger or push rod. Thanks to the invention, most of the load applied on roller 40 along direction D1 is received by insert 320 instead of tappet 10, then is transmitted to the plunger or push rod. Insert 320 is more resistant than bearing portion 120 to load transmitted from roller 40, in other words insert 320 increases mechanical resistance of system 1. Tappet 10 slides back and forth along direction D1 and D2 but bears few mechanical strains along axis Y1.

Other non-shown embodiments can be implemented without leaving the scope of the invention. For example, tappet 10, insert 20 or 320 and/or roller element 40 may have different configurations, by example depending on the intended application of system 1.

According to a non-shown embodiment, system 1 may constitute a rocker arm, wherein the support element 10 is not a tappet and wherein the roller element 40 is secured to an arm and a tappet, for example acting on a valve stem.

According to another non-shown embodiment, system 1 comprises no rolling bearing 50, while pin 30 and roller 40 form together a plain bearing. Indeed, in heavy duty applications such as in diesel truck engines, there is a lack of space and/or excessive loads involved for the implementation of the rolling bearing 50, thus justifying the use of a plain bearing. Alternatively, bearing 50 may be replaced by a bushing.

According to another non-shown embodiment, system 1 comprises at least two antirotation devices 24 and/or 80. By example, two antirotation devices 24 may be formed on tab 23 and be aligned parallel to axis Y1, so that they can be positioned in the same groove formed in bore surrounding tappet 10. Alternatively, the two antirotation devices 24 may be diametrically opposed relative to axis Y1, with a first device formed on tab 23 and a second device formed on tab 24. According to another example, two antirotation devices 80 may be formed on body 11, aligned along direction D1 parallel to axis Y1 or diametrically opposed on either sides of body 11 relative to axis Y1. According to another example, number, shape and/or position of device(s) 24 and/or 80 may vary without leaving the scope of the invention.

According to another non-shown embodiment, bearing portion 120 is devoid of pairs of tabs 121 and 122. Pin 30 is positioned in contact with partial bores 123 and 124 formed in bearing portion 120 and with sections 558 and 568 formed in insert 320.

According to another non-shown embodiment, ribs 125 and 126 each comprises a stub protruding along axis X1 toward the opposite rib 126 or 125. A recess is formed by a blind hole inside each end 35 of the pin 30. Thus, stubs 28 and 29 ensure radial retention of pin 30 relative to axis X1. In this case, tappet 10 may be devoid of tabs 121 and 122.

According to another non-shown embodiment, the pairs of tabs 121 and 122 and/or the ribs 125 and 126 are integrally formed with the insert 320 positioned inside body 11.

According to another non-shown embodiment, grooves 171 and 172 and inserts 181 and 182 are not annular. In other words, they extend only partly around axis Y1. By example, groove 171 and insert 181 extend around axis Y1 over an angle of 180 degrees on the same side as rib 125, while groove 172 and insert 182 extend around axis Y1 over an angle of 180 degrees on the same side as rib 126.

Whatever the embodiment, system 1 is such that insert 20 or 320 supports pin 30, while tappet body 11 supports insert 20 or 320, along at least the direction D1 parallel to axis Y1. Insert 20 supports pin 30, while tappet body 11 supports insert 20, along both directions D1 and D2. Insert 320 supports pin 30, while tappet body 11 supports insert 320, along direction D1 but not direction D2.

Contrary to US-A-2008 190 237, insert 20 or 320 rests directly against protrusions 92 formed in body 11 without an intermediate ring and without specific recesses formed in insert 20 or 320.

In addition, technical features of the different embodiments of the invention can be, in whole or part, combined with each other. Thus, the mechanical system 1 and its manufacturing method can be adapted to the specific requirements of the application.

The invention claimed is:
1. A mechanical system, comprising:
   a tappet including a body being generally cylindrical in shape, the body extending between an upper edge and a lower edge,
   an insert mounted in the body and fixed thereto such that there is no relative movement therebetween,
   a pin extending along a first axis, and
   a roller element movable in rotation relative to the pin around the first axis,
   wherein the insert comprises a first flange and a second flange each having a bore therethrough that are configured to support the pin along the first axis, the first and second flanges of the insert each comprising a lower surface that is configured to abut the upper edge of the body of the tappet such that the body at least partially supports the insert, along at least one first direction which is perpendicular to the first axis.
2. The mechanical system according to claim 1, wherein the body includes at least one local deformation adapted to prevent the insert from moving along the first direction when the mechanical system is in service.

3. The mechanical system according to claim 1, the body includes at least one local deformation adapted to prevent the insert from moving along a second direction opposed to the first direction along the second axis when the mechanical system is in service.

4. The mechanical system according to claim 1, wherein the pin comprises two opposite ends, each supported by one of the two flanges of the insert along at least the first direction.

5. The mechanical system according to claim 1, wherein the first direction is parallel to a second axis and the body is centered on the second axis.

6. The mechanical system according to claim 1, wherein the tappet is devoid of any through hole extending between an outer surface and an inner surface of the body.

7. The mechanical system according to claim 1, further comprising two ribs resting on either side of the ends of the pin for axial retention of the pin along the first axis.

8. The mechanical system according to claim 1, wherein the insert is clamped inside the body.

9. The mechanical system according to claim 1, wherein the insert is force-fitted inside the body.

10. The mechanical system according to claim 1, wherein the insert is mounted with a play inside the body, then fixed to the body, by example by crimping, welding or soldering.

11. The mechanical system according to claim 1, wherein the body is made of synthetic material, for example of polyamide or polyether-ether-ketone, or made of metal, for example of steel.

12. The mechanical system according to claim 1, comprising at least one antirotation device integrally formed with the body or with the insert.

13. The mechanical system according to claim 1, comprising a bearing interposed between the pin and the roller element.

14. The mechanical system according to claim 1, wherein it constitutes a cam follower, wherein the tappet is movable along the second axis and wherein the roller element is adapted to roll on an outer surface of a cam.

15. An injection pump for a motor vehicle comprising:
a mechanical system, including:
a tappet including a body being generally cylindrical in shape, the body extending between an upper edge and a lower edge,
an insert mounted in the body and fixed thereto such that there is no relative movement therebetween,
a pin extending along a first axis, and
a roller element movable in rotation relative to the pin around the first axis;
wherein the insert comprises a first flange and a second flange each having a bore therethrough that are configured to support the pin along the first axis, the first and second flanges of the insert each comprising a lower surface that is configured to abut the upper edge of the body of the tappet such that the body at least partially supports the insert, along at least one first direction which is perpendicular to the first axis,
wherein the mechanical system is a subassembly integrated into the injection pump.

16. A valve actuator for a motor vehicle comprising:
a mechanical system, including:
a tappet including a body being generally cylindrical in shape, the body extending between an upper edge and a lower edge,
an insert mounted in the body and fixed thereto such that there is no relative movement therebetween,
a pin extending along a first axis, and
a roller element movable in rotation relative to the pin around the first axis;
wherein the insert comprises a first flange and a second flange each having a bore therethrough that are configured to support the pin along the first axis, the first and second flanges of the insert each comprising a lower surface that is configured to abut the upper edge of the body of the tappet such that the body at least partially supports the insert, along at least one first direction which is perpendicular to the first axis,
wherein the mechanical system is a subassembly integrated into the valve actuator.

17. A method for manufacturing a mechanical system comprising steps of:
obtaining components of the mechanical system, the components including:
a tappet including a body being generally cylindrical in shape, the body extending between an upper edge and a lower edge,
an insert comprising a first flange and a second flange each having a bore therethrough, the first and second flanges further comprising a lower surface,
a pin extending along a first axis, and
a roller element;
mounting the insert within the body such that there is no relative movement therebetween and such that the lower surface of the first and second flanges abut the upper edge of the body of the tappet;
assembling the roller element to be movable in rotation relative to the pin around the first axis; and
positioning the pin in the bores of the insert while the insert is positioned in the body.

18. The method for manufacturing a mechanical system according to claim 17, further comprising a step of:
including at least one local deformation adapted to prevent the insert from moving along the first direction when the mechanical system is in service.

* * * * *